May 13, 1952 G. B. SOLOVIEFF 2,596,796
SAFETY CONTROL FOR GASEOUS FUEL BURNERS
Filed Jan. 14, 1947 2 SHEETS—SHEET 1

INVENTOR
George B. Solovieff.
BY
HIS ATTORNEY

INVENTOR
George B. Solovieff.
BY
HIS ATTORNEY

Patented May 13, 1952

2,596,796

UNITED STATES PATENT OFFICE 2,596,796

SAFETY CONTROL FOR GASEOUS FUEL BURNERS

George B. Solovieff, South Gate, Calif., assignor to Robertshaw-Fulton Controls Company, a corporation of Delaware Application January 14, 1947, Serial No. 722,004

10 Claims. (Cl. 137—139)

This invention relates to safety control apparatus for fuel burners and, more particularly, to combined resetting and indicating devices for thermoelectric safety controls.

It has been proposed to reset a thermoelectric safety device and open the safety valve by utilizing the simple rotation of a dial instead of a push-button operation. In this invention, the same expedient is employed but in a more compact and economical arrangement due to coaxial relation of the various parts. The object of facilitating the resetting operation is thus preserved in the improved arrangement.

An object of the invention is to reset the thermomagnetic safety device and indicate the control position by a common operation.

Another object of the invention is to indicate clearly the operational sequence for resetting the control.

Another object of the invention is to automatically retain the resetting dial in an operated position if the control is properly set in operation.

Another object of the invention is to automatically return the setting dial to unoperated position if the control is not functioning.

Another object of the invention is to prevent flow of fuel to the main burner during the resetting operation while permitting such flow to a pilot burner.

Other objects and advantages will become apparent from the following description taken in connection with the accompanying drawings, wherein.

Figure 1:
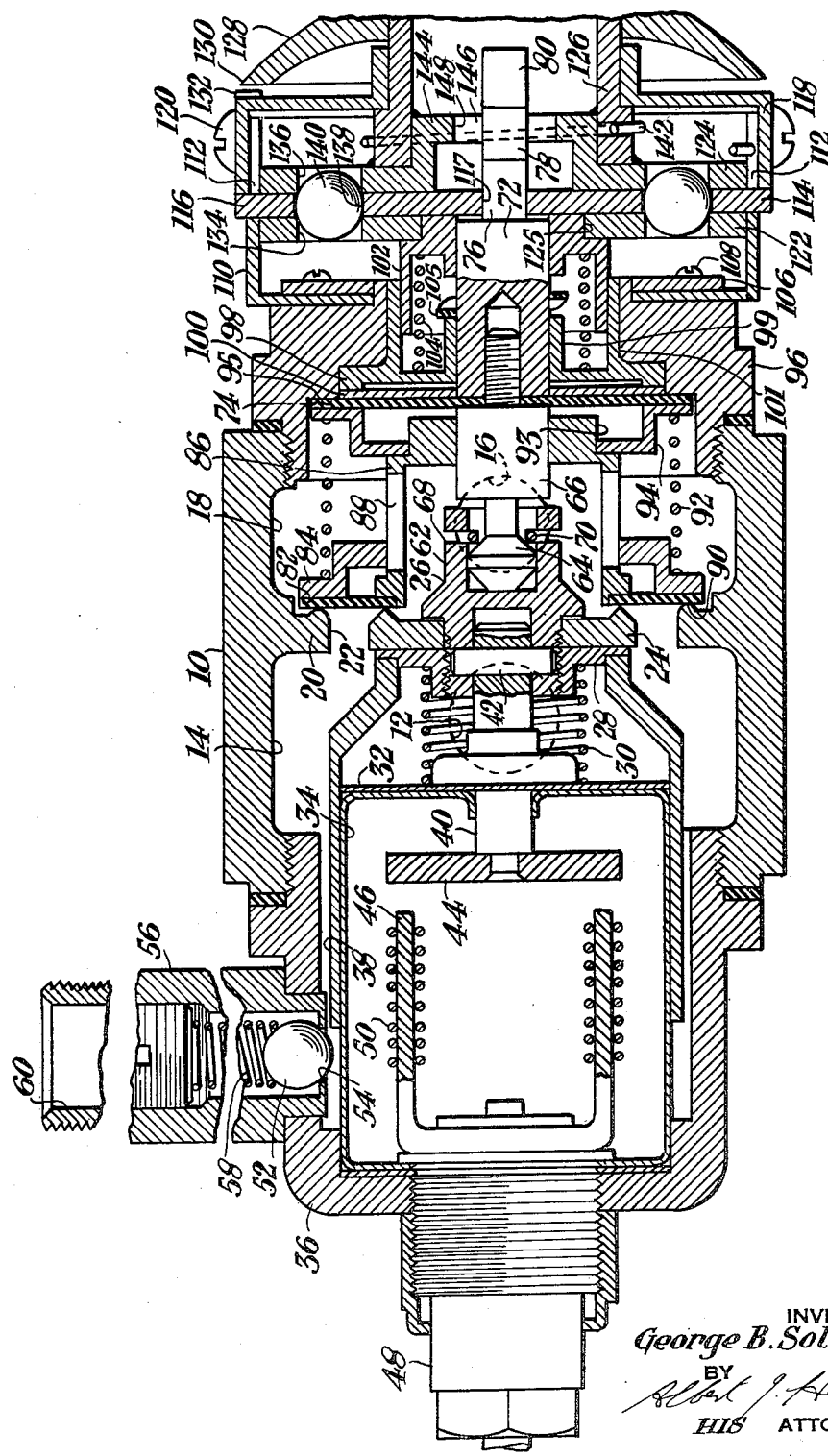
Fig. 1 is a cross section of a thermoelectric safety control embodying the invention.

Referring more particularly to the drawings, the control device shown therein comprises a casing 10 having an inlet opening 12 communicating with an inlet chamber 14 and an outlet opening 16 communicating with an outlet chamber 18. A partition 20 separates the inlet chamber 14 from the outlet chamber 18 and is provided with a passage 22 extending therethrough axially of the casing 10.

A valve member 24 is supported within the passage 22 upon a valve stem 26 and has its outer periphery spaced from the wall of the opening 22. The valve stem 26 extends through the valve member 24 and is provided with a nut 28 for securing the valve member 24 in position on the valve stem 26. The nut 28 supports one end of a coil spring 30 which has its opposite end supported upon a stuffing-box member 32 positioned at one end of magnet housing 34 exteriorly thereof. The opposite end of the magnet housing 34 is supported within an end cap member 36 threadedly secured to the casing 10. Sufficient clearance is provided between the outer side wall of the magnet housing 34 and the inner side wall of the end cap member 36 to accommodate a cup-shaped actuating sleeve 38 which is slidable over the magnet housing 34 and projects therefrom into engagement with the nut 28 to which it is secured.

The end wall of the magnet housing 34 adjacent the stuffing box member 32 is suitably apertured for the reception of a connecting stem 40 having one end fastened to the valve stem 26 by a pin 42 while the opposite end is secured to an armature member 44 positioned within the magnet housing 34. The armature member 44 is adapted for cooperation with a horseshoe magnet 46 which is rigidly supported in the housing 34 on a hollow terminal connection 48 extending axially of the end cap member 36 and threadedly engaging the end wall thereof for projection on the exterior thereof. The arrangement is such that when the valve member 24 is in the position shown in Fig. 1 of the drawings, the armature member 44 is spaced from the pole faces of the horseshoe magnet 46 and upon movement of the valve member 24 to the left as viewed in the drawings, the armature member 44 will become engaged with the pole faces of the horseshoe magnet 46. The usual winding 50 is provided for the horseshoe magnet 46 and is electrically connected through the terminal connection 48 with a suitable source of electrical energy which will be described more fully hereinafter.

The actuating sleeve 38 is adapted to be reciprocated into and out of engagement with a ball valve 52 and cause movement thereof away from its seat 54. The ball valve seat 54 is formed on a connection 56 secured to the end cap member 36 and being provided with a coil spring 58 for biasing the ball valve 52 toward its seat 54. The connection 56 is provided with an outlet opening 60 for connection to a pipe or conduit, to be described hereinafter.

Figure 5:
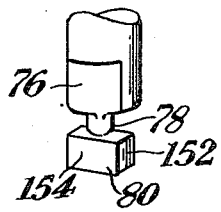
Fig. 5 is a perspective view of a detail.

The valve stem 26 extends through the valve member 24 on the side opposite the nut 28 and has a hollow end 62 within which a conical head 64 of a reset stem extension 66 is received. The hollow end 62 is provided with an annular recess 68 to accommodate a spring ring 70 which serves to retain the conical end 64 in position. The reset stem extension 66 is secured to a reset stem 72 and an annular diaphragm element 74 is clamped between the stem 72 and the extension 66 at its median portion. As will be more fully described hereinafter, the reset stem 72 has a projecting end, shown more clearly in Fig. 5, which is provided with oppositely disposed flats 76 adjoining a cylindrical reduced portion or neck 78 which, in turn, adjoins a rectangular end portion 80.

The valve member 24 is shown as seated upon a second diaphragm element 82 of annular form and having its outer area supported by a retaining ring 84 on one side thereof. The inner area of the second diaphragm 82 is supported on one side and inner periphery thereof upon a lantern member 86 which is slidably mounted upon the reset stem extension 66 and upon which the retaining ring 84 is slidably mounted. A plurality of apertures 88 are provided in spaced arrangement in the wall of the lantern 86 to permit flow of fuel from the inlet chamber 14 to the outlet chamber 18 past the valve member 24 when the latter is disengaged from its seat on the second diaphragm 82. The second diaphragm 82 engages with a seat 90 formed on the partition 20 and such engagement is maintained under bias of a coil spring 92 which is operative at one end against the retaining ring 84 and at the opposite end against a second retaining ring 94. The lantern 86 has a reduced shoulder 93 on which the retaining ring 94 is mounted.

The first-mentioned diaphragm 74 abuts the retaining ring 94 and is biased by the coil spring 92 against a shoulder 95 formed on an end flange 96 which is threaded to the casing 10. The diaphragm 74 thus provides a closure for the end of the casing 10 containing part of the resetting mechanism. The end flange 96 is recessed to receive an outer housing 98 which engages at its outer end with a support plate 100 for the diaphragm 74. The outer housing 98 has an inner annular flange 99 which slidably receives the reset stem 72 and also an outer annular flange 101 which slidably receives an inner housing 102 carried on the reset stem 72. A coil spring 104 is operative for biasing the two housings 98 and 102 apart. In addition, a flat spring 105 is positioned on the reset stem 72 between the housings 98 and 102 to act in conjunction with the spring 104 for override purposes as will be apparent hereinafter.

Secured to the outer end face of the end flange 96 and by a plate 106 and screws 108 is a cup-shaped housing 110 having a pair of oppositely disposed slots 112 extending from the open end thereof and terminating midway from the closed end. The slots 112 are adapted for the reception of oppositely disposed lugs 114 formed on the periphery of a ball retaining plate 116 which is thus secured in the housing 110 against rotation. The ball retaining plate 116 has an axial aperture 117 of rectangular form to receive the flats 76 on the reset stem 72 and prevent rotation of the latter. A cover member 118 extends over the slotted end of the housing 110 and is secured thereto by the screws 120 for retaining the ball retaining plate 116 in position.

Positioned one on each side of the ball retaining plate 116 within the housing 110 and the cover member 118, respectively, is a pair of disc elements 122 and 124. The disc element 122 is supported upon a shoulder 125 formed on the inner housing 102 and is thereby biased toward the ball retaining plate 116 by the coil spring 104 operative on the housing 102. The disc element 124 is secured by welding, brazing or other means to a hollow shank 126 which extends from the cover 118 and carries a dial 128 secured against rotation thereon. The dial is provided with a pointer 130 cooperable with indicia "off," "on," and "Light pilot" which may be marked, as at 132, in spaced relation on the cover 118 as indicated in Figs. 2, 3 and 4 inclusive.

The disc element 122 is provided with a pair of diametrically opposite apertures 134 which are adapted to register with a pair of arcuate slots 136 formed at diametrically opposite points in the disc element 124. The ball retaining plate 116 is also provided with a pair of diametrically opposite apertures 138 adapted to register with the apertures 134 and the slots 136. The apertures 138, however, are of larger diameter than the apertures 134 or the width of the slots 136 and accommodate a pair of ball elements 140 which are freely slidable therein but which are unable to pass through the apertures 134 in the disc element 122. A torsion spring 142 is operative between the shank 126 and the cover 118 to cause return movement of the dial 128 and associated parts when manual pressure is released on the dial 128.

Figure 2:
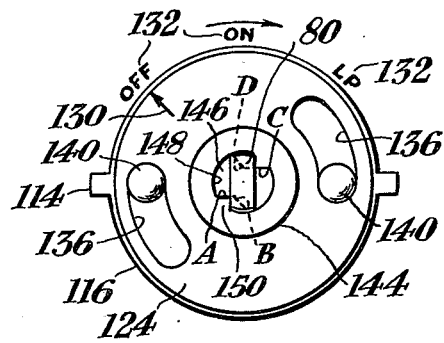
Fig. 2 is a diagrammatic end view on a reduced scale showing the resetting means and indicating device in an unoperated position.
Figure 3:
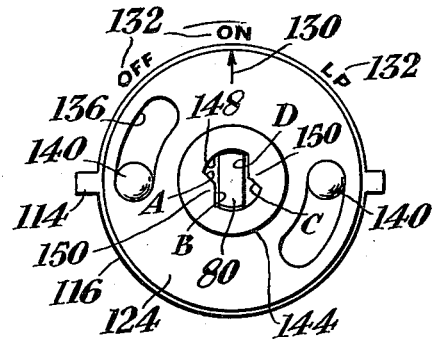
Figs. 3 and 4 are end views similar to Fig. 2 but showing the resetting means and indicating device in different positions.
Figure 4:
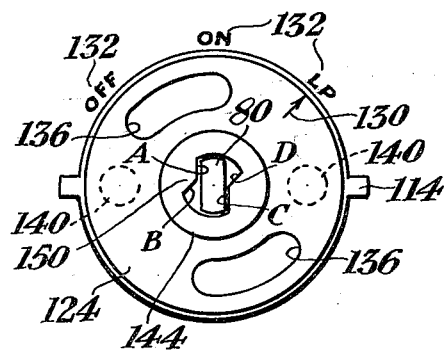

As shown more clearly in Figs. 2–4 inclusive, the disc element 124 is provided with an annular flange 144 on the opposite face thereof to the retaining plate 116 and which extends over the reset stem portions 76 and 78 when the parts are positioned as shown in Fig. 1. The flange 144 is inturned at its outer end and provided with an axial opening 146 which has a pair of oppositely disposed arcuate walls 148 and a pair of V-shaped, indented, connecting walls 150. The reference characters A, B, C and D denote the four sides of the connecting walls 150 in counterclockwise order in Figs. 2–4.

The rectangular end portion 80 of the reset stem 72 has opposite arcuate walls 152 (Fig. 5) of substantially the same diameter as the reset stem 72. There are two opposite flat sides 154 which lie in substantially the same plane as the flats 76 on the reset stem 72. The reduced cylindrical portion 78 intermediate the rectangular end 80 and the flats 76 is diametrically uniform with the thickness of the rectangular end portion 80 across the flat sides 154. Thus, the arcuate walls 152 are slidably engageable with the arcuate walls 148 of the opening 146. The connecting walls 150 of the opening 146 are adapted to extend substantially parallel with the flat sides 154 of the rectangular end 80 in certain positions of the parts.

Figure 6:
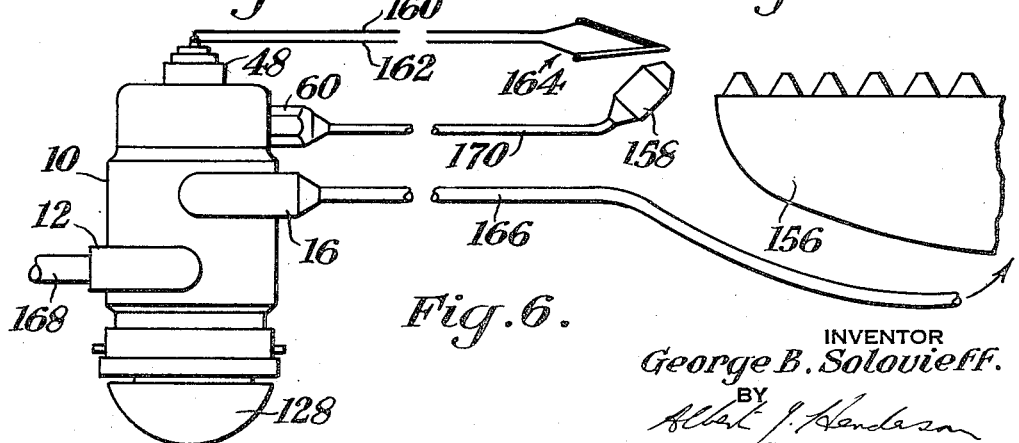
Fig. 6 is a schematic view of a fuel burning apparatus having the invention applied thereto.

In Fig. 6 of the drawings a schematic view of the improved control device is shown connected to control a main burner 156 having a pilot burner 158 in lighting proximity thereto. The terminal connection 48 serves to connect the leads 160 and 162 of a thermocouple 164 in circuit with the magnet winding 50. The thermocouple 164 is exposed to the heat of a flame at the pilot burner 158 and forms a means responsive to the heat of the burning fuel for energizing the electromagnet comprising winding 50, magnet 46 and armature 44. The main burner 156 is shown as connected by a pipe 166 to the outlet 16 of the control body 10 while the inlet 12 is connected to a pipe 168 leading from a source of fuel supply. The pilot burner 158 has a conduit 170 connected to the pilot connection 60 on the control body 10.

In the operation of the device, it may be assumed that the burners 156 and 158 are not operating so that the parts of the control device are in the positions shown in Figs. 1 and 2. To place the burners in operation, the dial 128 is manually rotated in a clockwise direction, as shown by the arrow in Fig. 2, from the position shown in Fig. 2 in which the ball elements 140 engage a pair of the end walls of the arcuate slots 136. After approximately 45° revolution, the disc element 124 will have rotated to the position shown in Fig. 3 and this rotation is relatively to the ball retaining plate 116 and the other disc element 122. Such relative rotation is limited by the opposite pair of end walls of the arcuate slots 136 coming into abutting relation with the ball elements 140. In this position, the sides B and D of the axial opening 146 extend parallel with the flat sides 154 of the rectangular end portion 80 of the reset stem 72. The reduced cylindrical portion 78 of the reset stem 72 is opposite the axial opening 146 so that free rotation of the disc element 124 is permitted.

Further rotating movement of the dial 128 in a clockwise direction will cause the ball elements 140 to be forced down and under the surface of the disc element 124, such movement of the ball elements 140 being axially of the retaining plate 116 due to their capability of passing through the apertures 138 therein. The position of the ball elements 140 after this further rotary movement relative to the disc element 124 and the retaining plate 116 is shown in Fig. 4 it being noted that the legend "Light pilot" is now in registry with the pointer 130. Moreover, the sides A and C of the axial opening 146 now extend parallel with the flat sides 154 of the rectangular end portion 80.

It will be apparent that the ball elements 140 are prevented from rotating with the disc element 124 during the further rotary movement thereof described. These ball elements 140 are retained in fixed relation to the other disc element 122 by the relatively stationary ball retaining plate 116. Consequently, the retaining plate 116 forms a means for causing movement of the ball elements 140 into interposed relation between the disc elements 122, 124 by converting the torque applied by the disc element 124 on the ball elements 140 into an axial thrust on the other disc element 122. This thrust is sufficient to cause an axial movement of the valve member 24 and the armature means 44 to the left as viewed in Fig. 1 in a manner now to be described.

The axial movement of the disc element 122 is transmitted to the various elements of the control as follows, it being noted that the movement in all cases is axial where this term is omitted; to the inner housing 102 and to the outer housing 98 through the coil spring 104 and flat spring 105 interposed between these housings and which are not compressed at this time. The movement of the outer housing 98 is transmitted thereby to the plate 100, the diaphragm member 74 and the retaining ring 94. The bias of the coil spring 92 is overcome by the movement of retaining ring 94 and the lantern element 86 moves relative to the other retaining ring 84 and causes the inner area of the second diaphragm 82 to flex about the seat 90. At this juncture it should be noted that the outer area of the second diaphragm 82 is maintained against the seat 90 with increased force due to compression of the spring 92 toward the other retaining ring 84.

The second diaphragm 82 moves the valve member 24 and its stem 26 which is connected to the reset stem extension 66 and reset stem 72. The projecting portion of the reset stem 72 having the flats 76 is pulled through the rectangular aperture 117 in the ball retaining plate 116 by the reset stem movement and the rectangular end 80 is now housed within the axial opening 146. It will be apparent that the parallel arrangement of the sides A and C with the flat sides 154 permit this movement and that the arrangement is retained without rotation of the parts being possible due to the rectangular aperture 117 being complemental to the flattened end 76 of the reset stem 72.

The movement of the valve member 24 is transmitted to the armature 44 by the connecting member 40. The armature is thus placed in engagement with the pole faces of the magnet 46 and the bias of the coil spring 30 is overcome. The ball valve member 52 is moved off its seat 54 by the action of the actuating sleeve 38 which is moved by the nut 28 attached to the valve stem 26.

The purpose of the springs 104 and 105 is apparent when it is mentioned that the armature 44 is seated against the pole faces of the magnet 46 before the ball elements 140 have completely withdrawn from the arcuate slots 136 in the disc element 124. Thus, the two springs 104, 105 provide an override arrangement to ensure seating of the armature 44. The springs 104, 105 are, consequently, slightly compressed at the time the position shown in Fig. 4 is reached.

Flow of fuel through inlet opening 12, connection 56, pilot outlet 60, and conduit 170 to the pilot burner 158 now occurs. The flow of fuel to the main burner 156 is still cut-off due to the engagement of the valve member 24 with the second diaphragm 82. The pointer 130 is indicating the "Light pilot" position on the indicia 132 shown in Fig. 4. After the pilot burner 158 is lighted and the thermocouple 164 becomes heated thereby, the magnet 46 will be energized by its winding 50 to retain the armature 44 in its attracted position where it is operative for retaining the valve member 24 in open position as soon as this is permitted as now to be described.

The manual torque on the dial 128 is now released and the torsion spring 142 serves to rotate the disc element 124 and the dial 128 in a counter-clockwise direction as viewed in Fig. 4. The position shown in Fig. 3 is then reached due to the sides B and D of the axial opening 146 coming in contact with the flat sides 154 of the rectangular end portion 80. Further rotary movement of the dial 128 will thus be prevented and the "on" position of the indicia 132 will be alinged with the pointer 130.

The ball elements 140 are at this time in registry with the original pair of end walls of the arcuate slots 136 and will be biased into their initial position within the slots 136 due to the action of the springs 104, 105, and 92. Consequently, a reversal of the position of certain parts now occurs as follows: the override of springs 104, 105 is relieved and the inner housing 102 moves to return the disc element 122 to its initial position shown in Fig. 1. The outer housing 98 and plate 100 are retracted under bias of the spring 92 which causes diaphragm 74 to be seated on the shoulder 95 by the retaining ring 94. The lantern 86 is thus caused to return to its original position and the flexing of the second diaphragm 82 ceases. As previously mentioned, the engagement of the outer area of this second diaphragm 82 with the seat 90 is preserved at all times. The disc elements 122 and 124 are biased toward each other and engage opposite sides of the ball retaining plate 116, the ball elements 140 being no longer interposed therebetween.

The valve member 24 is retained in its open position relative to the second diaphragm 82 as it is held by the connection with the armature 44 against the bias of spring 30. Fuel can flow from inlet 12, past valve member 24 into lantern 86 and through apertures 88 therein to the outlet 16. The fuel is conducted by the pipe 166 to the main burner 156 and ignited by the pilot burner flame. During this open setting of the valve member 24 the fuel is prevented from leaking into the resetting portion of the control by the engagement of the diaphragm 74 with the shoulder 95.

In the event that the pilot burner flame becomes extinguished, then the thermocouple 164 no longer energizes the electromagnet and the armature 44 moves to unattracted position under bias of the spring 30. The valve member 24 is thus moved to closed position in engagement with the second diaphragm 82 so that flow of fuel to the main burner is prevented. In addition, the ball valve 52 is no longer held away from its seat 54 by the actuating sleeve 33 and flow of fuel to the pilot burner will cease. The reset stem 72 moves to the right and causes the cylindrical section 78 of the projecting portion thereof to be housed within the aperture 146. Hence, the spring 142 is free to rotate the dial 128 to register the "off" position of the indicia 132, and cause the disc element 124 to return to its initial position shown in Fig. 2. The parts of the control device are then in the positions shown in Fig. 1 ready for another resetting operation.

Many changes may be made in the arrangement of parts and details of construction without departing from the invention as defined in the appended claims.

I claim:

1. In a control apparatus, control means adapted for axial movement between operative positions and being biased to one of said positions, an axially movable stem operatively associated with said control means, a control member coaxial with said stem and rotatable relative thereto, means for causing axial movement of the control means to another of said positions upon rotary movement of the control member to a limiting position, said means including a pair of elements one having operative torque transmitting engagement with the control member and the other having operative engagement with said stem, interengaging means for said elements adapted to transmit movement therebetween, and means cooperable with said interengaging means and operative upon rotation of said control member for converting the torque applied thereby to said one element into an axial thrust on said other element sufficient to cause said axial movement of the control means to the other said position, and means operable between said stem and said one element for limiting return movement of said control member from said limiting position, while said control means is in said other position.

2. In a control apparatus, control means adapted for axial movement between operative positions and being biased to one of said positions, an axially movable stem operatively associated with said control means, a control member coaxial with said stem and rotatable relative thereto, means for causing axial movement of the control means to another of said positions upon rotary movement of the control member to a limiting position, said means including a pair of elements one having operative torque transmitting engagement with the control member and the other having operative engagement with said stem for axial movement therewith, interengaging means movable relatively to said elements and being adapted to transmit movement therebetween, and means cooperable with said interengaging means and operative upon rotation of said control member for converting the torque applied thereby to said one element into an axial thrust on said other element, said interengaging means and said other element being thereby moved relatively to said one element sufficiently to overcome said bias and cause said axial movement of the control means to said other position and detent means operable between said stem and said one element for limiting return movement of said control member from said limiting position when said control means is in said other position, said detent means being ineffective when said control means is in said one position.

3. In a control apparatus, control means adapted for axial movement between operative positions and being biased to one of said positions, a control member mounted for rotary movement relative to the control means, and means for causing axial movement of the control means to another of said positions upon rotary movement of the control member, said means including a pair of apertured disc elements one having operative engagement with the control member and the other having operative engagement with the control means for axial movement therewith, a plurality of ball elements having an inoperative position each extending partly within one of the apertures in one disc element and partly within a registering aperture in the other disc element, said ball elements being incapable of extending completely through the apertures in either disc element, and means interposed between said disc elements and apertured to receive said ball elements therethrough, said last means being secured against rotation relative to said other disc element and being constructed and arranged to prevent translatory movement of said ball elements relative to said other disc element whereby rotation of said one disc element relative thereto will effect movement of said ball elements out of the apertures in said one disc element into interposed relation between said disc elements and establishing an operative position thereof for applying an axial thrust on said other disc element sufficient to overcome said bias and cause said axial movement of the control means to the other said position.

4. In a control apparatus, control means adapted for axial movement between operative positions and being biased to one of said positions, a control member mounted for rotary movement relative to said control means and having a plurality of operative positions, and means for causing axial movement of the control means to another of said positions upon rotary movement of the control member to a limiting position, said means including a pair of elements one having operative torque transmitting engagement with the control member, connecting means between the other said element and the control means having a portion extending into operative engagement with said one element, interengaging means for said elements adapted to transmit movement therebetween and to said connecting means, means cooperable with said interengaging means and operative upon rotation of said control member for converting the torque applied thereby to said one element into an axial thrust on said other element sufficient to cause said axial movement of the control means to said other position, and means operable between said portion of the connecting means and said one element for limiting return movement of said control member from said limiting position while said control means is in said other position.

5. In a control device, control means adapted for axial movement between operative positions and being biased to one of said positions, means for retaining said control means in another of said positions after said control means has been moved thereto, means for actuating said control means to said other position including a control member mounted coaxially of said control means for rotary movement relative to said control means in one direction, spring means for returning said control member in a reverse direction when said rotary movement is terminated, means adapted for rotary movement with said control member having abutments thereon, and means cooperable with said control means for engagement with said abutments when said control means is retained in said other position for limiting the reverse movement of the control member and being free from said abutments when said control means is in said one position.

6. In a control device, control means adapted for axial movement between operative positions and being biased to one of said positions, means for retaining said control means in another of said positions after said control means has been moved thereto, a control member mounted for rotary movement relative to said control means in one direction, means for causing axial movement of said control means to said other position upon rotary movement of said control member in said one diretcion, said last means including a pair of elements one having operative engagement with the control member and having abutments thereon, spring means for returning said control member in a reverse direction when said rotary movement is terminated, and connecting means between the other said element and the control means having a portion extending into engagement with said abutments when said control means is retained in said other position for limiting reverse movement of the control member.

7. In a fluid control device, valve means adapted for axial movement between open and closed positions for controlling the flow of fluid, an electromagnetic device having an armature operative for retaining said valve means in an open position, means for biasing said valve means to closed position and said armature to inoperative position, means for resetting said armature in operative position including reciprocable means operatively associated with said armature and valve means, a control member mounted for rotary movement relative to said armature and valve means and subjected to a torsional bias, means for causing axial movement of said armature to said operative position and said valve means to open position, said last means including a pair of elements one having operative engagement with the control member for rotational movement therewith and the other having operative engagement with the valve means for axial movement therewith, a wedging device cooperable with said elements and movable into interposed relation therebetween upon rotation of said control member against said torsional bias to impart axial movement to said other element and overcome said valve biasing means, means for energizing said electromagnetic means sufficiently to hold said armature in operative position, and means cooperable with said valve means for operative engagement with said control member when said valve means is in said open position to limit movement of the control member under said torsional bias and being free of said control member when said valve means is in said closed position.

8. In a fluid control device, valve means adapted for axial movement between open and closed positions for controlling the flow of fluid, an electromagnetic device having an armature operative for retaining said valve means in an open position, means for biasing said valve means to closed position and said armature to inoperative position, means for resetting said armature in operative position including reciprocable means operatively associated with said armature and valve means, a control member mounted for rotary movement relative to said armature and valve means, means for causing axial movement of said armature to said operative position and said valve means to open position, said last means including a pair of apertured disc elements one having operative engagement with the control member and the other having operative engagement with the valve means for axial movement therewith, a plurality of ball elements each extending partly within one of the apertures in one disc element and partly within a registering aperture in the other disc element, said ball elements being incapable of extending completely through the apertures in either disc element, means interposed between the disc members and apertured to receive said ball members therethrough, said last means being secured against rotation relative to said other disc element and adapted to prevent translatory movement of said ball elements relative to said other disc element whereby rotation of said one disc element in one direction relative thereto will effect movement of said ball elements into interposed relation between said disc elements to overcome said biasing means, means for energizing said electromagnetic means sufficiently to hold the armature in operative position, and yieldable means for torsionally biasing said control member and causing rotation of said control member and said one disc element in another direction to effect movement of said ball elements out of interposed relation to permit movement of said armature to inoperative position when said electromagnetic means is not energized.

9. In a fluid control device, a casing having a fluid supply passage and inlet and outlet openings communicating therewith, a control valve member between said openings and biased to one controlling position, an armature operatively associated with said valve member, electromagnetic means cooperable with said armature for retaining said valve member in another controlling position, resetting means for moving said armature and said electromagnetic means relative to each other to establish an operative connection therebetween and set said valve member in said other position, and an annular diaphragm extending across said passage between said openings and being operatively engageable by said reset means and by said valve member in said one controlling position to interrupt communication between said openings, said diaphragm being yieldable during the resetting operation for maintaining said operative engagement and interruption of communication between said openings.

10. The device as claimed in claim 9 wherein said reset means and valve member operatively engage said diaphragm on opposite sides thereof adjacent the inner periphery thereof, and means for clamping a portion of said diaphragm adjacent the outer periphery thereof in sealing engagement with said casing.

GEORGE B. SOLOVIEFF.

REFERENCES CITED

The following references are of record in the file of this patent:

UNITED STATES PATENTS

| Number | Name | Date |
| --- | --- | --- |
| 1,511,830 | Foley | Oct. 14, 1924 |
| 1,941,711 | Nielsen | Jan. 2, 1934 |
| 2,257,024 | Ray | Sept. 23, 1941 |
| 2,297,718 | Ray | Oct. 6, 1942 |
| 2,299,649 | Paille | Oct. 20, 1942 |
| 2,313,890 | Ray | Mar. 16, 1943 |
| 2,342,316 | Wantz | Feb. 22, 1944 |
| 2,371,351 | Paille | Mar. 13, 1945 |
| 2,447,307 | Ray | Aug. 17, 1948 |
| 2,455,521 | Rice | Dec. 7, 1948 |